United States Patent [19]
Knothe et al.

[11] 3,805,907
[45] Apr. 23, 1974

[54] OPTICAL NULL-TYPE INDICATOR SUITABLE FOR A BALANCE

[75] Inventors: Erich E. K. Knothe, Gottingen-Geismar; Franz-Josef Melcher, Gottingen-Nikolausberg, both of Germany

[73] Assignee: Sartorius-Werke GmbH, Gottingen, Germany

[22] Filed: Sept. 4, 1973

[21] Appl. No.: 393,819

[30] Foreign Application Priority Data
Sept. 4, 1972  Germany............................ 2243379

[52] U.S. Cl......... 177/210, 177/DIG. 6, 250/231 R, 250/234
[51] Int. Cl............................................. G01g 3/14
[58] Field of Search......... 250/231 R, 234; 177/210, 177/DIG. 6

[56] References Cited
UNITED STATES PATENTS
| | | | |
|---|---|---|---|
| 3,118,068 | 1/1964 | Duchene et al................ | 177/DIG. 6 |
| 3,469,102 | 9/1969 | Huvers........................... | 250/234 X |
| 3,421,594 | 1/1969 | Hino.............................. | 177/DIG. 6 |

*Primary Examiner*—George H. Miller, Jr.
*Attorney, Agent, or Firm*—Edmund M. Jaskiewicz

[57] ABSTRACT

An optical null-type indicator for a balance in which two rotatably mounted, and thereby adjustable, photoelectric transducers are placed in the path of a beam of light emanating from a light source, the beam of light being interrupted on deflection of the balance by a diaphragm stop having a width slightly less than the effective light emitting surface of the light source. In a null position both transducers are equally illuminated.

9 Claims, 2 Drawing Figures

PATENTED APR 23 1974                                    3,805,907

OPTICAL NULL-TYPE INDICATOR SUITABLE FOR A BALANCE

BACKGROUND OF THE INVENTION

The invention relates to an optical null-type indicator for an electrical balance, in which a beam of light is projected by a light source towards two photoelectrical transducers and a diaphragm stop in the path of the light beam moves across the light beam when the load on the balance varies.

An optical null-type indicator of this kind for an electrical balance has been described in the published specification of German Pat. Application No. 1,190,220. The purpose of the indicator is to show when the measuring element of the balance, such as its weightbeam a moving coil, swings into a predetermined position. A controlled amplifier sends a current through a coil operating the measuring element in such a way that the current just balances the load, the current flowing through the coil just providing a measure of the load.

OBJECT OF THE INVENTION

It is an object of the present invention to provide an improved optical null-type indicator for a balance, especially an electrical balance.

SUMMARY OF THE INVENTION

In contradistinction to the null-type indicator already known in the art the present invention provides an optical null-type indicator suitable for balance, and comprising two photoelectric transducers, a light source spaced from the transducers and arranged to project a beam of light towards the transducers and a diaphragm stop in the path of the light beam and arranged to move across the light beam when the load on a balance, to which the indicator is secured, varies, the diahragm stop defining a slot extending through the diaphragm stop and perpendicularly to its direction of motion, and light-sensitive surfaces of the transducers facing the light source being spaced apart and jointly rotatable about the axis of propagation of the light beam for the purpose of effecting adjustment.

A narrow beam of light from the light source passes through the slot in the diaphragm stop and falls on the light-sensitive surfaces of the two transducers, which surfaces are preferably circular. For the purpose of adjustment the transducers are rotated about the axis of the light beam until in zero position the beam illuminates about one half of each of the two light-sensitive surfaces. An electronic circuit arrangement ascertains when the same amount of light falls on each transducer. Rotation of the two transducers permits a position of adjustment to be found at which the resolution of the indicator is maximum. Tests have disclosed that the attainable resolution is in the order of 1 um and less.

The principal advantages afforded by the invention arise in manufacture. The perpendicular distance of the light-sensitive surfaces from the point of maximum illumination by the beam through the slot can be adjusted by joint rotation of both transducers, and to this end the two photoelectric transducers are positioned in recesses provided in an axially symmetrical member rotatably mounted in a holder. Maximum sensitivity is attained when the transducers are in a position in which one half of each light-sensitive surface is illuminated. In such a case a given displacement of the slot results in a maximum change in power of the electrical signal generated by the two photoelectric transudcers.

Moreover, the accuracy of the indicator long depends upon the precision with which the sockets for the reception of the photo-electric transducers are bored. Nor is it necessary for the transducers to be specially selected and matched with regard to their sensitivity maxima.

Important are also the geometrical relationships and dimensions which are hereinafter set forth.

Since the light source and the transducer can be closely adjacent, namely as close together as will just provide adequate clearance for the diaphragm stop to move between them without experiencing friction, means for collimating the beam, such as a condensing lens, can be omitted. However, the distance of the light source from the transducers is so considerable that a condenser would necessarily have to be provided if a small light source were used in order to avoid the generation of undesirable heat.

If according to a further feature of the invention the light source employed is a gallium-arsenide diode and the transducers are silicon photo-transistors, then the further advantage will be secured of the light source emitting light principally in a spectral region to which silicon photo-transistors are particularly responsive. Whereas the use of semiconductor elements already permits light to be emitted with a minimal generation of heat, the particular semiconductor elements which the present invention proposes to employ still further reduce the generation of heat. This is important in the construction of balances, because the presence of heat sources may lead to error in weighing.

DESCRIPTION OF THE SPECIFIC EMBODIMENT

Figure 1:
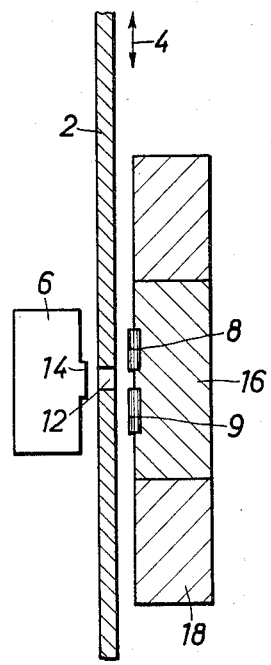
FIG. 1 is a part sectional schematic side elevation of a null-type indicator according to the invention.

Referring to FIG. 1, one end, for example the upper end, of a diaphragm stop 2 is attached to the measuring element of a balance for instance to the beam of an electric micro-balance. When the measuring element is deflected this diaphragm stop moves in the directions indicated by the double-headed arrow 4 between a light source 6 and light-sensitive surface 8, 9 of two photoelectric transducers. The diaphragm stop contains a slot 12 extending perpendicularly to the plane of the drawing and having a width of say 1 mm. The light source 6 is a semi-conductor element, particularly a gallium-arsenide diode having a light-emitting surface 14 of a width preferably slightly exceeding the width of the slot, for instance of 1.5 mm. The longitudinal direction of the light emitting surface likewise extends perpendicularly to the plane of the drawing and parallel to the slot 12.

The light sensitive surfaces 8 and 9 of the two photoelectric transducers are preferably circular and may have a diameter of more paiicularly 2 mm, whereas the distance between them will preferably be 1 mm. The transducers are then spaced apart a distance equal to the width of the slot, whereas the light source is a little wider. Both photoelectric transducers are held in a member 16 which is rotatably mounted in a holder 18. The holder 18 and the light source 6 are firmly attached to the frame of the balance.

Figure 2:
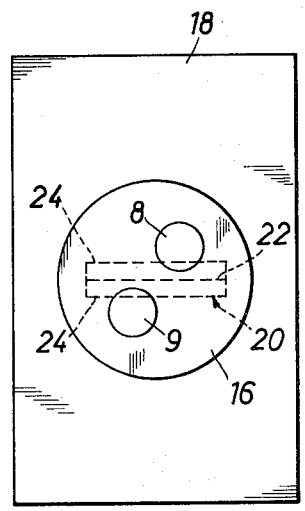
FIG. 2 is a view from above of two photoelectric transducers of the indicator illustrated 1n FIG. 1 showing the manner in which they are mounted.

During use of the described arrangement a light beam 20 indicated by a dotted outline in FIG. 2, falls on the light-sensitive surfaces 8 and 9, causing an associated electronic circuit not shown in the drawing to indicate when both surfaces 8 and 9 are equally illuminated. By rotating the member 16 it is possible to find a position of adjustment in which the power of resolution is a maximum. When this is the case and the balance is in null position about one half of each of the two photo-electric transducers will be illuminated. Owing to the width of the slot in relation to the width of the light source the slot produces a very blurred image of the light source, namely a band of light 20 having maximum intensity in its longitudinal axis 22, whereas towards each edge 24 its intensity decreases. Surprisingly it transpires that such a light beam is capable of providing high resolution. The arrangement responds to displacements of the diaphragm stop of 1 micron and even less.

What is claimed is:

1. An optical null-type indicator suitable for a balance, and comprising two photoelectric transducers, a light source spaced from the transducers and arranged to project a beam of light towards the transducers, and a diaphragm stop in the path of the light beam and arranged to move across the light beam when the load on a balance, to which the indictor is secured, varies, the diaphragm stop defining a slot extending through the diaphragm stop and crosswise to its direction of motion, and light-sensitive surfaces of the transducers facing the light source being spaced apart and jointly rotatable about the axis of propagation of the light beam for the purpose of effecting adjustment.

2. An indicator according to claim 1 wherein the distance between said light-sensitive surfaces is approximately equal to the slot width.

3. An indicator according to claim 1 wherein the light-emitting surfaces are positioned closely adjacent the diaphragm stop leaving sufficient clearance only for motion of the diaphragm stop.

4. An indicator according to claim 1 wherein the two photoelectric transducers are positioned in recesses provided in an axially symmetrical member rotatably mounted in a holder.

5. An indicator according to claim 1 wherein the light-sensitive surfaces are circular.

6. An indicator according to claim 1 wherein the width of a light emitting surface of the light source slightly exceeds the slot width.

7. An indicator to claim 6 wherein the width of the light emitting surface is approximately 1.5 time s the slot width.

8. An indicator according to claim 1 characterized in that the light source and the photoelectric transducers are semi-conductor elements 9. An indicator according to claim 8, wherein the light source is a gallium-arsenide diode and the transducers are silicon photo-transistors.

* * * * *